Nov. 11, 1947.  E. I. STEARNS, JR., ET AL  2,430,833
PHOTOMETRIC APPARATUS GIVING READINGS INVARIANT
WITH AZIMUTH ON POLARIZING SAMPLES
Filed June 1, 1944   3 Sheets-Sheet 3

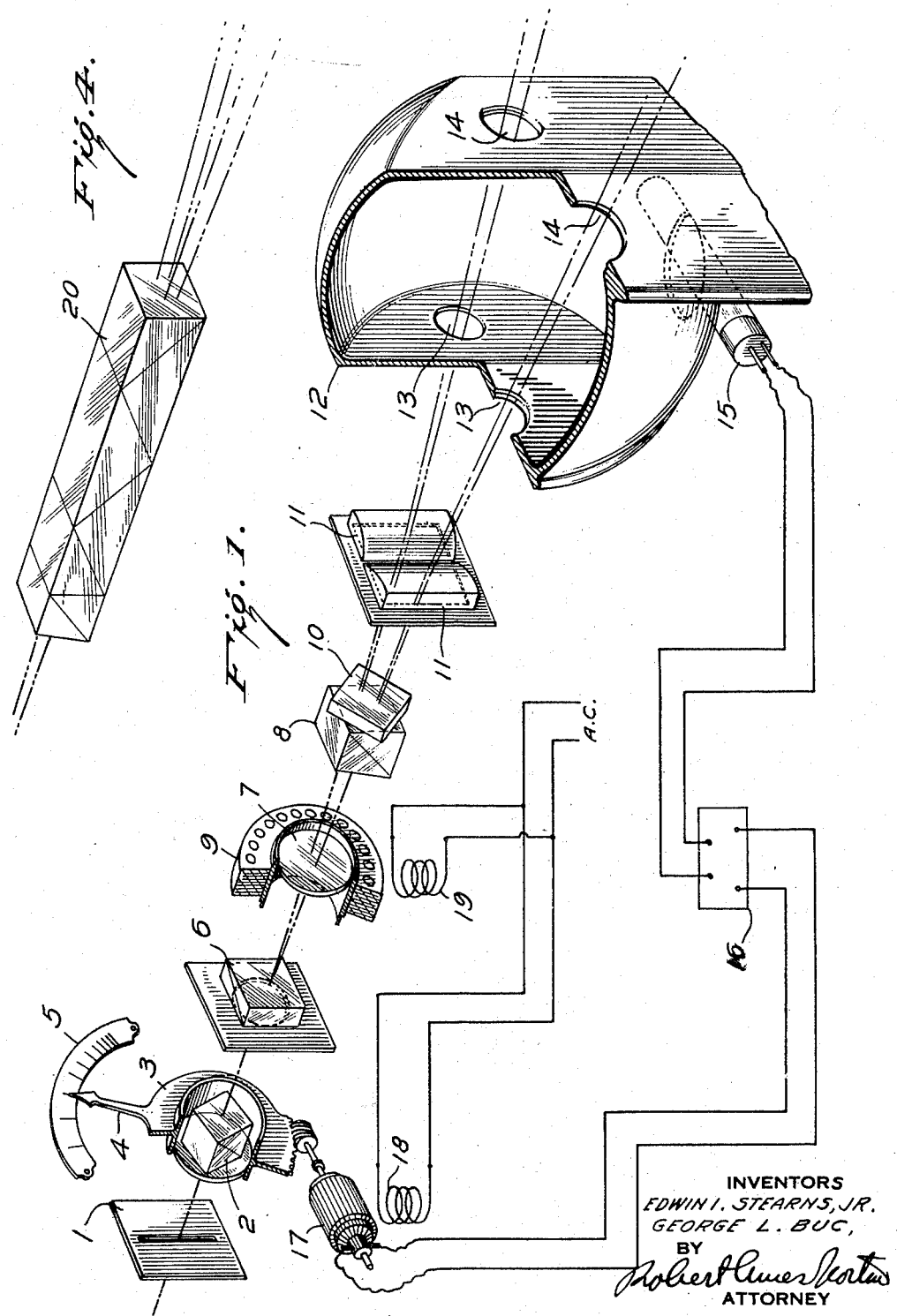

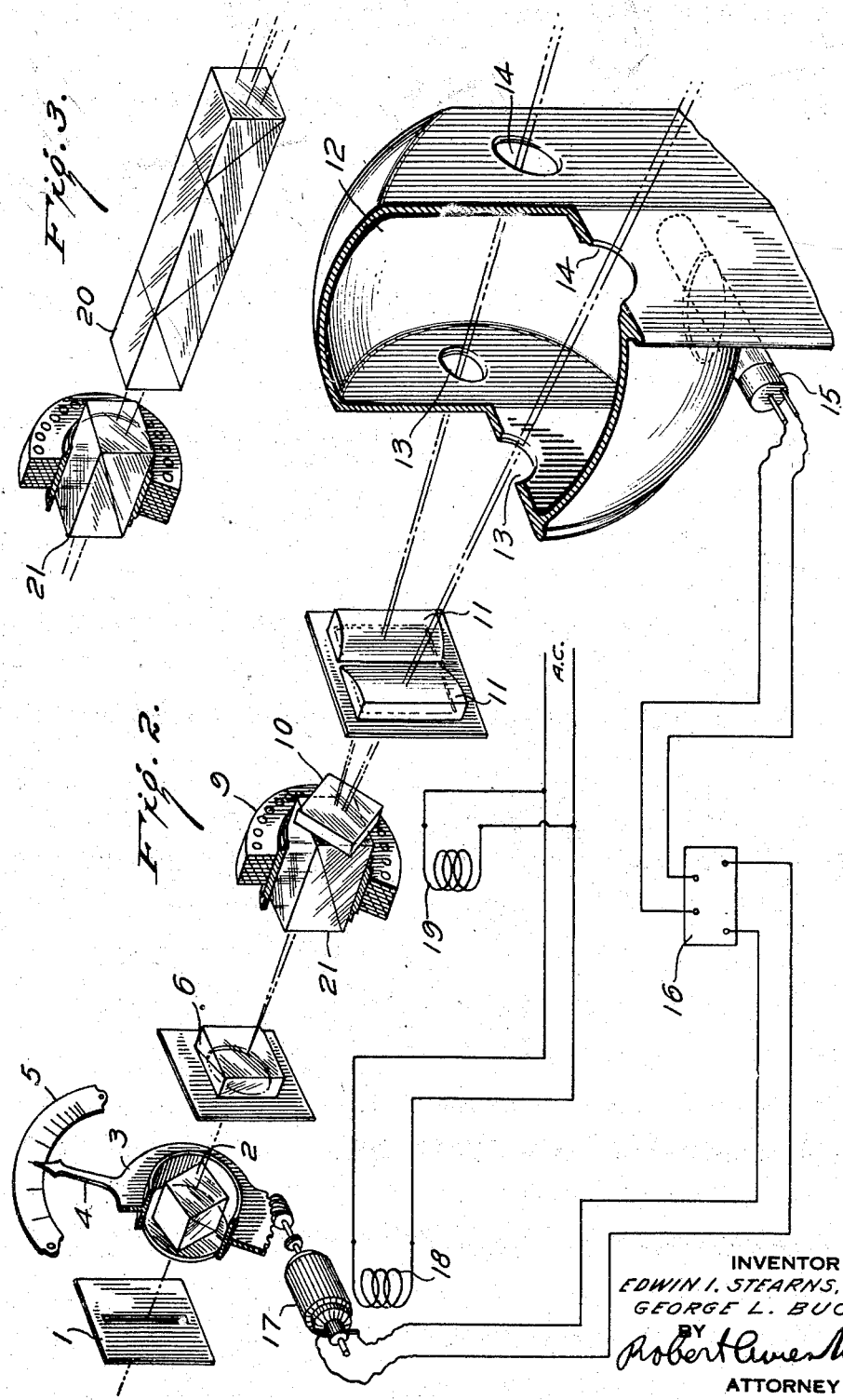

INVENTORS
EDWIN I STEARNS, JR.
GEORGE L. BUC,
BY
Robert Ames Norton
ATTORNEY

UNITED STATES PATENT OFFICE 2,430,833

PHOTOMETRIC APPARATUS GIVING READINGS INVARIANT WITH AZIMUTH ON POLARIZING SAMPLES

Edwin I. Stearns, Jr., North Plainfield, and George L. Buc, Orange, N. J., assignors to American Cyanamid Company, New York, N. Y., a corporation of Maine Application June 1, 1944, Serial No. 538,305

12 Claims. (Cl. 88—14)

This invention relates to improved photometric devices involving polarizing elements.

A number of photometric devices have been developed and some of them involve polarizing elements. In some cases the polarization is incidental and performs no useful function. Thus, for example, monochromating devices produce varying degrees of polarization at different wave lengths of light in the visible, ultra violet and infra red spectrum. The polarizing may be due to reflection from mirrors or other elements incidental to the photometric apparatus. In most cases the polarization performs no useful function but is unavoidable. Examples of such devices are ordinary photometric spectrophotometers, spectrographs and the like.

Another type of photometric apparatus in which polarization may enter is comparison colorimeters using split comparison fields. An example of such is a Duboscq colorimeter in which polarization results from the mirrors in the instrument. In general any photometer which uses a mirror will introduce various degrees of polarization.

Some photometric instruments and spectrophotometers use polarization deliberately to effect photometering. A simple instrument of such a type is a Martens photometer in which light beams from a sample and standard pass through a Wollaston prism which polarizes them at right angles. Polarizers such as a Nicol or a Rochon prism effect photometering. This type of device is also used in the Koenig-Martens spectrophotometer.

In more recent years polarized flickering beam spectrophotometers have achieved great success and their speed and precision account for their predominant position.

All of these types of apparatus possess a common characteristic, namely, the optical system includes a sample illuminating means and photometering means in which at least one element polarizes light partially or wholly. All of these instruments give different readings when a polarizing sample is present depending on the orientation of the sample, that is to say, its azimuth with respect to the optical axis of the polarizing elements of the instrument. This variance is known as the azimuth effect and introduces a serious error even in the most highly developed spectrophotometers of the polarizing flickering beam type. The first successful commercial machine of this type is described and claimed in the patent to Orrin Weston Pineo, No. 2,107,836, February 8, 1938. In this spectrophotometer, light from a Van Cittert double monochromator passes through a photometering Rochon prism, then through a Wollaston prism and finally through a Rochon prism which is rotated at an accurately predetermined rate by means of a synchronous motor. The two beams from the Wollaston prism which are polarized at right angles to each other after passing through the rotating Rochon strike samples and standards of either reflectance or transmission and the total light from the two beams is integrated in an integrating sphere and the integrated light impressed on a phototube which is in the input circuit of a very high gain audio frequency amplifier. The amplified output is then impressed on the armature of a motor, the field of which is supplied with the same current used in driving the synchronous motor and in turn drives the photometering Rochon prism in a direction which will result in a change in intensity of the flickering beams to cause the light from each beam in the integrating sphere to be equal, at which time there is present in the integrating sphere no light fluctuation at flicker frequency and hence no amplified signal at flicker frequency. The photometering motor may drive an indicating device or an automatic recorder of known design.

The polarized flickering beam spectrophotometer has achieved great success because in its most elaborate modifications curves of photometric absorption or reflectance can be automatically drawn in a very short time. Great as is the advance represented by the polarized flickering beam spectrophotometer over early instruments, in its original form the device had some disadvantages. By that method, the light incident on the specimen is varying its plane of polarization, so that in many cases an unknown factor of variation is introduced which may vitiate the results. Further, spurious signals of the fundamental and harmonic frequencies are produced in the photocell circuit which obscure the vanishing signal at balance and so result in loss of sensitivity in detecting the balance point.

In the patent of O. W. Pineo, No. 2,126,410, August 9, 1938, there are described a number of different flickering means which when followed by a stationary polarizer, such as for example a Rochon prism, produce reliable flickering with beams which maintain a constant plane of polarization instead of a plane which rotates with rotation of the flicker prism as in the early Pineo patent referred to above. These means include a rotating retardation plate, such as a half wave plate, Kerr cells impressed with alternating voltage at flicker frequency or magnetostrictive devices. In the improved instrument which is described in the two Pineo patents the reduced sensitivity with a polarizing sample is completely overcome and for the first time it becomes possible to obtain reliable and accurate spectrophotometric measurements of polarizing samples. The great advance in sensitivity and accuracy with polarizing samples, however, is obtained only if the orientation of the sample is constant and hence the azimuth of polarization does not change. Conflicting results were obtained if the same sample was measured at different azimuths.

In the patent of O. W. Pineo, No. 2,189,270, February 6, 1940, there is described an improvement on the instrument using a stationary plane of polarization in which the final Rochon prism is followed either by a quarter wave plate or a Fresnel rhomb. Both of these devices transfer plane polarized light into circularly polarized light which is not sensitive to change in azimuth of the sample. The improvement described in the last mentioned Pineo patent, while of definite practical value, was not a complete solution of the azimuth problem because unfortunately a quarter wave plate gives a retardation of exactly a quarter of a wave length at only one frequency of light. Lights of other frequencies within the visible spectrum are not circularly polarized but are elliptically polarized with ellipses of increasing eccentricity as the frequency of the light varies from that at which the quarter wave plate gives a true retardation of a quarter of a wave length. The elliptically polarized light at other frequencies materially reduces the azimuth effect over plane polarized light but is still not perfect.

The Fresnel rhomb is less sharply selective with respect to wave length and from this standpoint gives a greater degree of azimuth correction. However, as described in the patent, it requires an offset in the light path and presents some mechanical disadvantages as compared to a quarter wave plate.

A somewhat different form of polarizing flickering beam spectrophotometer is one in which the integrating sphere is replaced by a lens which brings together the two divergent beams onto a phototube or other photoelectric device. In order to avoid critical adjustment the image on the photoelectric means may be thrown slightly out of focus or the beams may be focussed on a ground glass or similar diffuser so that the photoelectric means is illuminated by diffuse combined light. In the simple photometric apparatus or Pineo spectrophotometer the azimuth problem is the same.

According to the present invention the azimuth effect is completely removed at all wave lengths by splitting the beam from the sample and from the standard into two beams polarized at right angles to each other or circularly polarized one having a right hand rotation and the other a left hand rotation. In other words, the two beams have conjugate polarization with respect to the axis of polarization. That is to say, the orientations of polarizing states are mirror images with respect to the axis of symmetry. The response is the average which may be obtained from either beam alone and this cancels out the azimuth effect because the average is not changed by the different orientations of the polarizing sample.

The elements which split the beams must be located between the sample and the nearest element in the device which introduces polarization because the desired effect is to cancel out asymmetrical polarization by the sample. If the beam is split beyond the nearest polarizing element it will be ineffective because the damage will already have been done.

The design of the optical instrument will determine whether the beam splitting element can be single or whether separate beam splitters must be used. In flickering beam spectrophotometers, spectrographs such as a Hilger spectograph, Martens photometers and Koenig-Martens spectrophotometers the beams from sample and/or standard are so closely adjacent that a single beam splitting device may be used. In other instruments such as a Duboscq colorimeter the beams may be too far apart and separate beam splitting elements are then necessary. Wherever possible it is desirable to use a single beam splitting device as no difficulty is involved in matching.

In general, known optical devices can be used to effect the beam splitting. A very compact beam splitting device is a Wollaston prism which splits the beam into two beams plane polarized at right angles to each other. By reason of its compactness a Wollaston prism is preferred. However, the elimination of azimuth effect may be brought about by using optically rotatory properties. For this purpose a Fresnel multiple prism is employed. This consists of alternate prisms of right and left handed rotatory material such as quartz. The retardation of circularly polarized components is different and as the alternating elements are prismatic deviation is effected and two circularly polarized beams emerge, one clockwise and the other counter-clockwise.

The elimination of azimuth effect may be considered as due to the fact that the algebraic sum of the azimuth effects of the two beams is zero in the case of Wollaston prisms and in the case of a Fresnel multiple prism, the effect of each beam is zero and the algebraic sum is still zero.

The various types of beam splitting devices employed result in different degrees of deviation. Thus, for example, Wollaston prisms and Fresnel multiple prisms can be designed to produce beams of light with almost any desired degree of deviation. Where a device is used which induces a large angle of deviation, the two beams may scan the sample as separate spots. This is quite unobjectionable in the case of any sample which has a uniform polarization and absorption over its whole area, a condition which is true for a majority of samples. In measuring samples that are not completely uniform in polarization there is an advantage in using a low deviation device such as a Wollaston prism with small deviation or a Fresnel multiple prism of low deviation which will produce overlapping spots of light on the sample and for practical purposes a beam splitting device of as low deviation as possible is preferable, although the invention is not limited thereto.

While the elimination of the azimuth effect is generally effected by means of the present invention in any of the types of photometering instruments involving polarization it performs additional functions in certain polarized flickering beam spectrophotometers. In a Pineo spectrophotometer using half wave plate flickering, only elimination of azimuth effect results. When, however, Rochon flickering is used an important additional advantage is obtained because the lack of sensitivity in measuring polarizing samples is overcome. In instruments using Rochon flickering, the present invention presents two advantages instead of one and it is a further advantage that the two results are obtained without any compensating disadvantages.

In the case of a Wollaston prism, the prism must maintain a fixed orientation of 45° with respect to the axis of the Rochon prism and this requires that the Wollaston rotate with the flicker prism which can be easily effected by cementing it to the rear face of the flicker prism. The extreme thinness of a low deviation Wollaston prism makes this a simple matter as it is so light that it can be affixed to the flickering prism of an existing machine. This is a great advantage of the present invention because existing polarizing flickering beam spectrophotometers can be improved without rebuilding any major elements and older types can be modernized at nominal cost. Fresnel multiple prisms do not need to rotate and they also present no serious problem with flickering beam spectrophotometers using Rochon flickering.

The invention will be described in greater detail in conjunction with the drawings in which:

Fig. 1 is a perspective view of an indicating spectrophotometer using half wave flickering and a Wollaston prism;

Fig. 2 is a perspective view of a similar instrument using Rochon flickering;

Fig. 3 is a detail of a Rochon flicker prism associated with a Fresnel multiple prism;

Fig. 4 is a detail of a stationary Rochon prism and a Fresnel multiple prism;

Figure 5:
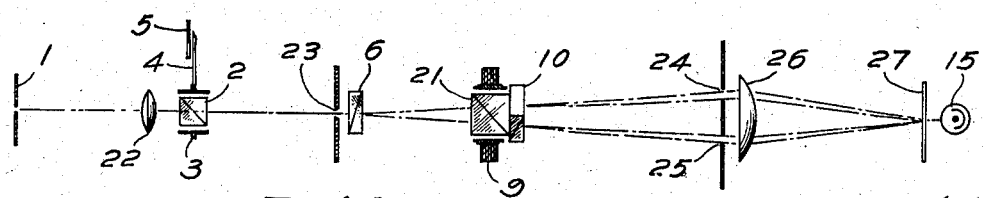
Fig. 5 is a diagrammatic view of a flickering beam spectrophotometer using Rochon flickering and a recombination of the two beams instead of an integrating sphere.

In the spectrophotometer shown in Fig. 1, a narrow band of light emerges from the exit slit 1 of the monochromator (not shown) which may be of any conventional design. The beam then passes through a photometering prism 2 carried in a rotatable hollow sleeve 3 which is provided with a pointer 4 moving over a scale 5. The photometering prism, which is preferably a Rochon prism, serves the purpose of transforming the light into plane polarized light which is then passed through a Wollaston prism 6 which splits the beam into two divergent beams plane polarized at right angles to each other. The two beams then pass through a half wave plate 7 which is rotated at one quarter flicker frequency by a synchronous motor 9. The half wave plate causes the planes of polarization of the two beams to rotate at flicker frequency.

The beams then pass through a stationary Rochon prism 8 which causes the two beams to flicker. They then pass through a low deviation Wollaston prism 10 with the prism axis at 45° to the axis of the Rochon prism. The Wollaston prism splits each beam into two beams plane polarized at right angles to each other and deviating very slightly. The two pairs of beams then pass through the decentering lenses 11 and into the integrating sphere 12 through the windows 13. They strike the windows 14 where reflectance samples and standards may be placed in the conventional manner. Each sample is illuminated with two equal beams of light polarized at right angles to each other, and the total light reflected from a polarizing sample is therefore the same regardless of azimuth.

The light reflected from sample and standard is integrated in the sphere and shows no change at flicker frequency when the amount of light reflected from sample and standard is the same. Any change in absorption with wave length will cause the light in the sphere to pulsate at flicker frequency in phase with the more strongly reflected beam. This flicker frequency pulsation strikes the photo tube 15 and is transformed into a flicker frequency electric signal. The signal is amplified in the conventional manner by the high gain audio frequency amplifier 16 and the amplified output impressed on the armature 17 of a motor driving the photometering prism 2 through suitable gearing. The field 18 of the photometering motor and field 19 of the flicker motor are energized by alternating current of flicker frequency. The phase is so adjusted that the rotation of the photometering prism 2 is in a direction to produce balance in the integrating sphere. The amount by which the prism is turned is a measure of the unbalance and is indicated by the pointer 4 on the scale 5. If it is desired to have a record, the photometering motor may drive a conventional recorder in the conventional manner.

Fig. 2 shows a spectrophotometer very similar to that of Fig. 1, the same elements bearing the same reference numerals, except that a rotating Rochon prism 21 is used to produce flickering. The Wollaston prism 10 has to rotate with the Rochon prism in order to preserve its 45° orientation with respect to the axis of the latter. The prism is shown in the drawing as cemented to the Rochon prism and rotating therewith.

The pairs of beams enter the integrating sphere in the same manner as in Fig. 1 but each pair rotates about its own axis so that sample and standard are illuminated by two beams, plane polarized at right angles to each other, continuously rotating their plane of polarization. The effect on the light in the integrating sphere is identical with that of Fig. 1 and the same results are obtained regardless of the azimuth of a polarizing sample.

In Fig. 2 the rotating Wollaston prism not only performs the function of eliminating azimuth effect, which is the function it performs in Fig. 1, but it also removes the most serious drawback of an instrument using Rochon flickering, namely, its low sensitivity with certain polarizing samples. At the same time the advantageous features of Rochon flickering are retained, namely, great range and lack of very critical phase control. Thus the Wollaston prism performs two functions in Fig. 2 and combines all of the good points of Rochon flickering with the advantages of half wave plate flickering. In effect it transforms an instrument having Rochon flickering which is ordinarily inferior to one having a half wave plate into a superior instrument. For this reason the modification of Fig. 2 is preferred over that of Fig. 1.

Fig. 3 shows a stationary Fresnel multiple prism 20 associated with a rotating Rochon flicker prism. When this arrangement is substituted for the Rochon flicker prism with cemented Wollaston shown in Fig. 2, the instrument will produce substantially the same results. The mechanism by which azimuth effect is cancelled is, however, different. Instead of splitting each beam into two beams plane polarized at right angles to each other which is effected by the Wollaston prism in Figures 1 and 2 each beam is split into a pair of beams of circularly polarized light rotating in opposite directions. Deviation is extremely slight in the Fresnel multiple prism and an excellent blending of the light from the two beams on the sample and standard is therefore produced. As circularly polarized light has no orientation, the response is the same regardless of the azimuth of a polarizing sample.

The modification shown in Fig. 3 is somewhat more cumbersome than that shown in Fig. 2. The Fresnel multiple prism being much larger than the Wollaston prism, it is, therefore, less suitable for incorporation into an existing mechanism where the necessary space may not be available. On the other hand, the multiple prism does not rotate as must the Wollaston prism in Fig. 2 and in the design of a new machine this presents some advantages. Optically both devices achieve the same result.

Fig. 4 shows a detail view of a stationary combined Rochon prism and Fresnel multiple prism which takes the place of elements 8 and 10 in Fig. 1. The operation of the multiple prism is precisely the same as in Fig. 3. The advantages over the modification in Fig. 1 are however non-existent because in both Figs. 1 and 4 the beam splitting member is stationary. Its greater compactness and somewhat lower cost make the modification of Fig. 1 preferable to that of Fig. 4.

Fig. 5 is a diagrammatic view of the optics of a polarized light flickering beam spectrophotometer using combined images instead of an integrating sphere. The same parts bear the same reference numerals. The light issuing from the monochromator exit slit 1 is imaged on a slit 23 by the lens 22, the beam passing through a photometering Rochon prism 2 mounted in a rotatable sleeve 3 carrying a pointer 4 which moves over a scale 5. After leaving the slit 23 the beam passes through a Wollaston prism 6 which splits it into two divergent beams plane polarized at right angles to each other. These beams then pass through a Rochon flicker prism 21 rotated by the motor 9. On the rear of the flicker prism there is cemented a low deviation Wollaston prism 10 with its axis at 45° to that of the flicker prism. The operation of the mechanism is the same as in Fig. 2, each beam being split into two beams which pass through sample and standard windows 24 and 25. The double beams are then focused by the lens 26 onto the plane of a ground glass screen 27. The diffused light of the combined images illuminates the phototube 15, the output of which can be amplified to effect photometering in the conventional manner as is shown in Figs. 1 and 2.

The operation of the spectrophotometer is the same as that of the instrument shown in Figs. 1 to 4 except that it is suitable only for transmission samples. The correction of the azimuth effect and the improved sensitivity of the Rochon flickering with polarizing samples are the same as in Figs. 2 and 3.

Figure 6:
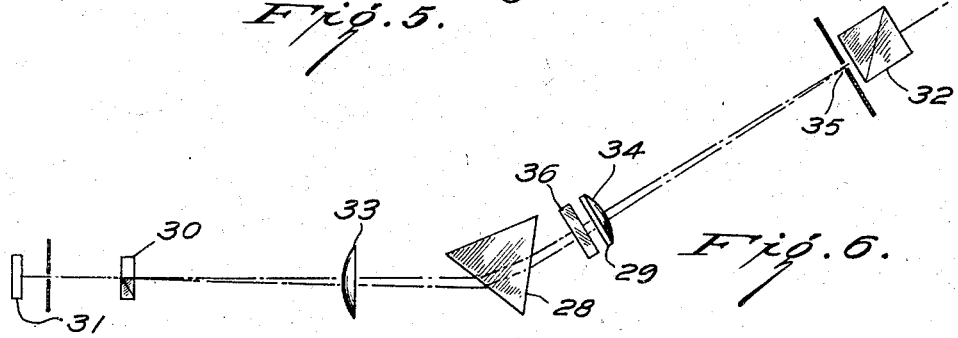
Fig. 6 is a diagrammatic elevation of a Koenig-Marten spectrophotometer using a Wollaston prism.

Fig. 6 illustrates a split field type of spectrophotometer, namely, a Koenig-Martens spectrophotometer in which light from a sample and standard is monochromated and photometered. The view is a horizontal elevation and shows the beam from one of the two samples 31 one of which may act as a standard. This beam passes through a low deviation Wollaston prism 30 and slightly deviating beams, plane polarized at right angles to each other, are collimated by the lens 33 and pass through a rotatable dispersing prism 28. The spectra from the two beams then pass through a Wollaston prism 36, the axis of which is at right angles to the plane of the figure, and finally through a bi-prism 29 and lens 34 which images the spectra on a slit 35. The narrow band of light from the slit then passes through a photometering Rochon prism 32 which can be turned to make the two fields from sample and standard beams equal in brightness. The figure is a diagram of the optics only, the photometering Rochon prism being naturally mounted in the conventional manner.

Non-uniform response from polarizing samples and standards at different azimuths is completely averaged by the Wollaston prism 30 which is the only added element in the Koenig-Martens spectrophotometer. The usefulness of the instrument is therefore extended to polarizing samples by an addition of a cheap optical element which does not require reconstruction of the instrument.

Figure 7:
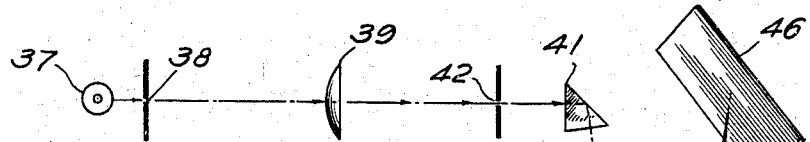
Fig. 7 is a perspective diagram of a Hilger spectrograph using the beam splitting device of the present invention.

Fig. 7 is a diagram, partly in perspective, of a Hilger spectrograph. Light from a source 37, which may be, for example, ultraviolet light, passes through the slit 38, collimating lens 39 and sample 42 onto the totally reflecting prism 41 inside the body of the spectrograph. The beam then passes through a low deviation Wollaston prism 40 which produces two slightly divergent beams plane polarized at right angles to each other. The deviation is enormously exaggerated in the diagram for the sake of clearness. The two beams then pass through recentering lenses 43 which remove the deviation and thence through the conventional lens 44 and dispersing prism 45 with reflecting back and again through the lens 44 onto the photographic plate holder 46. The diagram is that of a conventional spectrograph except for the elements 40 and 43. Non-uniform responses from polarizing samples at different azimuths are completely averaged for all wave lengths of the spectrum by the Wollaston prism 40. This element, with the recentering lenses, may be included in a conventional Hilger spectrograph without any reconstruction and it extends the usefulness of this optical device to the accurate measurement of polarizing samples regardless of the azimuth of the sample.

Figure 8:
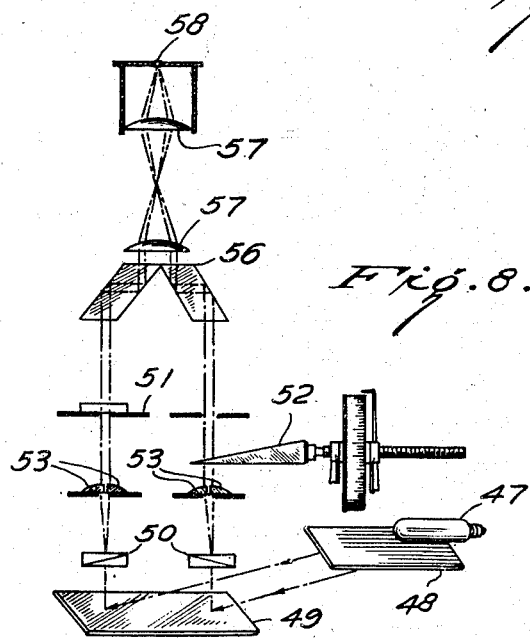
Fig. 8 is a perspective diagram of a Duboscq colorimeter using a pair of beam splitting elements.

Fig. 8 is a diagram, partly in perspective, of a conventional Duboscq colorimeter equipped with the beam splitting devices of the present invention. A source of light 47 illuminates a diffusing screen 48 and the diffused light is reflected by the mirror 49 up through the instrument which includes a sample holder 51 and photometering wedge 52, double reflecting prisms 56, lenses 57 and ocular 58. The only change in the instrument is the provision of low deviation Wollaston prisms 50 in the two beams, each prism being followed by a pair of recentering lenses 53. Instead of a single beam two parallel and substantially over-lapping beams, polarized at right angles to each other, traverse each leg of the instrument. Non-uniform response with polarizing samples to the varying degrees of polarization introduced by the mirror 49 is completely eliminated and the colorimeter may be used with polarizing samples with the same accuracy as with other samples.

Preferably Wollaston prisms of low deviation are employed. The deviation has been enormously exaggerated on the drawings to show the production of the two beams. In actual instruments the deviation is small and the two beams of each pair sensibly overlap.

In Figs. 5 to 8 a Wollaston prism has been shown as the beam splitting means. Precisely the same results are obtained with a Fresnel multiple prism as illustrated in Figs. 3 and 4 in conjunction with Figs. 1 and 2. The relative advantages and disadvantages are discussed in connection with Figs. 1 to 4 and apply equally to Figs. 5 to 8.

The advantages of the invention are not limited to instruments operating on light in the visible spectrum although these instruments represent the largest field of photometric apparatus. Elimination of the azimuth effect by means of the present invention is just as important with machines using ultraviolet light or infrared so long as the light still becomes polarized. For this reason the term "light" will be used in a broader sense to include ultraviolet and infrared. Similarly where reference is made to illumination it is not intended to limit the term to light in the visible spectrum.

When infrared or ultraviolet light is used suitable sources must be employed and also suitable receptors. In the former case for the near infrared they may be phototubes as shown in Figs. 1 to 5. Fig. 7 requires only the use of optics of a suitable material and appropriately sensitized film for use in the infrared. In general, a Hilger spectrograph with quartz optics may be used for most measurements in the ultraviolet and the near infrared.

Visual observation which is employed in the case of instruments shown in Figs. 6 and 8 must be replaced by photographic observation for the infrared and either photographic or fluorescent screen observation for the ultraviolet.

We claim:

1. In a photometric apparatus including a sample support, means for illuminating a sample on said support and photometric means positioned to receive light from a sample on said sample support, an essential element of the apparatus being inherently capable of polarizing light to a material extent sufficient to give different responses from a polarizing sample at various orientations, the improvement which comprises means intermediate the sample support and said element for splitting the light beam into two beams of equal intensity having conjugate states of polarization, whereby photometric readings from a polarizing sample are invariant with changes in the orientation of the sample.

2. A device according to claim 1 in which the beam splitting means is a Fresnel multiple prism.

3. A device according to claim 1 in which the beam splitting means is a Wollaston prism.

4. In a comparison photometric apparatus including means for supporting a sample and a comparison standard, means for illuminating with separate beams of light a sample and a comparison standard on said supporting means, photometric means and means for directing light from both sample and standard to the photometric means, an essential element of the illuminating means being inherently capable of polarizing light to a material extent sufficient to give different responses from a polarizing sample or standard at various orientations, the improvement which comprises means intermediate the sample and standard supporting means and said element for splitting the light beams illuminating sample and standard into two pairs of beams, the beams of each pair being of equal intensity and having conjugate states of polarization, whereby photometric readings from a polarizing sample are invariant with changes in the orientation of the sample or standard.

5. In a photometric apparatus comprising means for supporting a sample and a standard, a photoelectric device arranged to receive integrated light from a sample and a standard on said supporting means, an optical system arranged to control the light received by said device comprising in series an angularly movable polarizing member, a second member having the property of dividing a light beam into two beams which are polarized respectively in planes at right angles to each other and a third member between the second member and the sample and standard supporting means capable of causing each beam to flicker from a minimum to a maximum, the flickering of the two beams being in opposite phase, the direction of the beams and the location of the sample and standard supporting means being such that the sample is illuminated wholly by light from one of the beams and the standard wholly by light from the other beam, and means by which the first polarizing member is automatically angularly adjusted in accordance with the output of the photoelectric device in a direction to produce integrated light from the sample and standard free from fluctuations at flicker frequency, the improvement which comprises, positioned between the flickering means and the means for supporting the sample and standard, a device capable of splitting each flickering beam into two beams of equal intensity having conjugate states of polarization and directing the two pairs of beams to the sample and standard respectively.

6. A device according to claim 5 in which the flickering beam splitting device is a Fresnel multiple prism.

7. A device according to claim 5 in which the device capable of splitting the flickering beams is a Wollaston prism.

8. In a spectrophotometric apparatus comprising a support for a sample and a standard, a photoelectric device arranged to receive integrated light from a sample and standard on said support, an optical system arranged to control the light received by said device comprising in series an angularly movable polarizing member, a second member having the property of dividing a light beam into two beams which are polarized respectively in planes at right angles to each other, the direction of the beams and the location of the sample and standard supporting means being such that the sample is wholly illuminated by one beam and the standard wholly illuminated by the other, and a third member between the second member and the sample and standard supporting means capable of causing each beam to flicker from a minimum to a maximum, the flickering of the two beams being in opposite phase, means by which the first polarizing member is automatically angularly moved in accordance with the output of the photoelectric device in a direction to produce integrated light from the sample and standard free from fluctuations at flicker frequency, means for passing to the first polarizing member a beam of substantially monochromatic light, and means for varying the wave length of said monochromatic light from one end of the spectrum to the other, the improvement which comprises, positioned between the flickering means and the means for supporting the sample and standard, a device capable of splitting each flickering beam into two beams of equal intensity having conjugate states of polarization and directing the two pairs of beams to the sample and standard respectively.

9. A device according to claim 8 in which the flickering beam splitting device is a Fresnel multiple prism.

10. A device according to claim 8 in which the device capable of splitting the flickering beams is a Wollaston prism.

11. In a spectrophotometric apparatus comprising a support for a sample and a standard, a photoelectric device arranged to receive integrated light from the sample and standard, an optical system arranged to control the light received by said device, comprising in series an angularly movable polarizing member, a second member having the property of dividing a light beam into two beams which are polarized respectively in planes at right angles to each other, the direction of the beams and the location of the sample and standard supporting means being such that the sample is wholly illuminated by one beam and the standard wholly illuminated by the other, an uniformly rotatable polarizer between the second member and the sample and standard supporting means capable of causing each beam to flicker from a minimum to a maximum, the flickering of the two beams being in opposite phase, driving means for the first member responsive to alternating current of a pre-determined frequency, means for uniformly rotating the beam flickering member at such a speed as to cause the beams to flicker at the frequency to which the driving means of the first member is responsive, the photoelectric device being coupled to an amplifier capable of amplifying alternating current fluctuations produced by the device in response to fluctuations of light impinging thereon at flicker frequency, the driving means for the first polarizing member being connected to the output stage of the amplifier so that it is actuated by the flicker frequency component of the amplifier output to rotate the first polarizing member in a direction to produce integrated light from sample and standard free from fluctuations at flicker frequency, means for passing to the first polarizing member a beam of substantially monochromatic light, and means for varying the wave length of said monochromatic light from one end of the spectrum to the other, the improvement which comprises, positioned between the flickering means and the means for supporting the sample and standard, a device capable of splitting each flickering beam into two beams of equal intensity having conjugate states of polarization and directing the two pairs of beams to the sample and standard respectively.

12. In a spectrophotometric apparatus comprising a support for a sample and a standard, a photoelectric device arranged to receive integrated light from the sample and the standard, an optical system arranged to control the light received by said device comprising in series an angularly movable polarizing member, a second member having the property of dividing a light beam into two beams which are polarized respectively in planes at right angles to each other, the direction of the beams and the location of the sample and standard support being such that the sample is wholly illuminated by one beam and the standard wholly illuminated by the other, an uniformly rotatable element between the second member and the sample and standard support capable of rotating the planes of polarization of the beams at a pre-determined frequency, a fixed plane polarizing element through which the polarized beams pass, whereby the beams striking the sample and standard are caused to flicker from a minimum to a maximum in opposite phase, driving means for the first member responsive to alternating current of a pre-determined frequency, means for uniformly rotating the rotatable element at such a speed as to cause the beams to flicker at the frequency to which the driving means of the first member is responsive, the photoelectric device being coupled to an amplifier capable of amplifying alternating current fluctuations produced by the device in response to fluctuations of light impinging thereon at flicker frequency, the driving means for the first polarizing member being connected to the output stage of the amplifier so that it is actuated by the flicker frequency component of the amplifier output to rotate the first polarizing member in a direction to produce integrated light from the sample and standard free from fluctuations at flicker frequency, means for passing to the first polarizing member a beam of substantially monochromatic light, and means for varying the wave length of said monochromatic light from one end of the spectrum to the other, the improvement which comprises a device positioned between the fixed plane polarizing element and the sample and standard support capable of splitting each flickering beam into two beams of equal intensity having conjugate states of polarization and directing the two pairs of beams to the sample and standard respectively.

EDWIN I. STEARNS, Jr.
GEORGE L. BUC.

REFERENCES CITED

The following references are of record in the file of this patent:

UNITED STATES PATENTS

| Number | Name | Date |
|---|---|---|
| 2,194,910 | Pineo | Mar. 26, 1940 |